(12) United States Patent
Nanba

(10) Patent No.: US 7,894,135 B2
(45) Date of Patent: Feb. 22, 2011

(54) ZOOM LENS AND IMAGE PICKUP APPARATUS INCLUDING THE LENS

(75) Inventor: Norihiro Nanba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/476,074

(22) Filed: Jun. 1, 2009

(65) Prior Publication Data

US 2009/0251782 A1  Oct. 8, 2009

Related U.S. Application Data

(63) Continuation of application No. 11/938,997, filed on Nov. 13, 2007, now Pat. No. 7,609,446.

(30) Foreign Application Priority Data

Nov. 16, 2006  (JP)  ............... 2006-310480

(51) Int. Cl.
  *G02B 27/64*  (2006.01)
  *G02B 15/14*  (2006.01)
(52) U.S. Cl. .................. 359/557; 359/676
(58) Field of Classification Search ......... 359/554–557, 359/676–690
  See application file for complete search history.

(56) References Cited

U.S. PATENT DOCUMENTS

| | | | | | |
|---|---|---|---|---|---|
| 5,659,426 | A | * | 8/1997 | Aoki | .......................... 359/683 |
| 5,835,282 | A | * | 11/1998 | Suenaga et al. | ............. 359/692 |
| 5,847,882 | A | * | 12/1998 | Nakayama | .................. 359/684 |
| 6,025,962 | A | * | 2/2000 | Suzuki | ....................... 359/766 |
| 7,609,446 | B2 | * | 10/2009 | Nanba | ......................... 359/557 |
| 2003/0165020 | A1 | * | 9/2003 | Satori et al. | ................. 359/686 |
| 2007/0229966 | A1 | * | 10/2007 | Nakatani et al. | ............ 359/676 |

* cited by examiner

Primary Examiner—Thong Nguyen
(74) Attorney, Agent, or Firm—Canon USA Inc IP Div

(57) ABSTRACT

A zoom lens easily performs image stabilization with a compact and light image-stabilizing lens unit, properly corrects an aberration change during image stabilization, and achieves high optical performance. The zoom lens includes a first positive lens unit, a second negative lens unit, a third positive lens unit, a fourth negative lens unit, and a fifth positive lens. These lens units are arranged in order from an object side toward an image side, and are moved during zooming. The fourth lens unit is formed by one lens component, and is moved in a direction having a component that is perpendicular to the optical axis for image shifting. The Abbe number of a negative lens that forms the fourth lens unit, the thickness of the fourth lens unit on the optical axis, and the focal length of the entire zoom lens at the wide angle end are set appropriately.

5 Claims, 17 Drawing Sheets

ZOOM LENS AND IMAGE PICKUP APPARATUS INCLUDING THE LENS

CROSS-REFERENCE TO RELATED APPLICATIONS

This is a continuation of U.S. patent application Ser. No. 11/938,997 filed Nov. 13, 2007, now U.S. Pat. No. 7,609,446, which claims the benefit of Japanese Application No. 2006-310480 filed Nov. 16, 2006, all of which are hereby incorporated by reference herein in their entirety.

BACKGROUND OF THE INVENTION

1. Field of the Invention

The present invention relates to a zoom lens and an image pickup apparatus including the zoom lens that are suitably used in electronic cameras, such as a video camera and a digital still camera, a film camera, and a broadcasting camera.

2. Description of the Related Art

A zoom lens for use in an image pickup apparatus, such as a digital camera or a video camera, including a solid-state image pickup element is required to have a compact optical system, a high zoom ratio, and an image stabilizing function.

A positive lead zoom lens in which a lens unit closest to the object side has a positive refractive power can easily achieve a high zoom ratio, and therefore, is frequently used particularly as a zoom lens having a zoom ratio of 10 or more.

As a positive lead zoom lens, a compact five-unit zoom lens having a high zoom ratio is known in which five lens units having positive, negative, positive, negative, and positive refractive powers are arranged in that order from the object side to the image side.

U.S. Pat. Nos. 5,388,004, 5,659,426, 5,771,123, and 6704149 and Japanese Patent Laid-Open No. 2002-228931 disclose five-unit compact zoom lenses in which a fourth lens unit having a negative refractive power is formed by one component.

Further, zoom lenses having an image stabilizing function are also known. In the zoom lenses, image blurring caused when vibration is accidentally transmitted to an imaging system is compensated by moving some of the lens units perpendicularly to the optical axis.

A five-unit zoom lens disclosed in Japanese Patent Laid-Open No. 2000-298235 has an image stabilizing function for correcting image blurring by moving a third lens unit perpendicularly to the optical axis.

Particularly when the image-stabilizing lens unit is moved perpendicularly to the optical axis in the zoom lens, it is required to have a small size and a light weight for the purpose of size reduction and power saving of a moving mechanism.

Moreover, the zoom lens is required to have high optical performance while suppressing changes in aberration during image stabilization. In order to satisfy the above requirements, it is important to properly set the zoom type and the lens configuration of the image-stabilizing lens unit.

SUMMARY OF THE INVENTION

The present invention is directed to a zoom lens in which image stabilization can be easily performed with a compact and light image-stabilizing lens unit, a change in aberration during image stabilization is properly corrected, and high optical performance is achieved.

A zoom lens according to an aspect of the present invention includes a first lens unit having a positive refractive power, a second lens unit having a negative refractive power, a third lens unit having a positive refractive power, a fourth lens unit having a negative refractive power, and a fifth lens unit having a positive refractive power. The first to fifth lens units are arranged in order from an object side toward an image side. Zooming is performed by moving some of the five lens units so that a distance between the first lens unit and the second lens unit is longer, a distance between the second lens unit and the third lens unit is shorter, and a distance between the fourth lens unit and the fifth lens unit is longer at a telephoto end than at a wide angle end. The fourth lens unit is formed by one lens component. An image is shifted by moving the fourth lens unit in a direction having a component that is perpendicular to the optical axis. The following conditional expressions are satisfied:

$$63 < v4, \text{ and}$$

$$D4/fw < 0.3,$$

where $v4$ represents the Abbe number of the material of a negative lens that forms the fourth lens unit, $D4$ represents the thickness of the fourth lens unit on the optical axis, and $fw$ represents the focal length of the entire zoom lens at the wide angle end.

Further features of the present invention will become apparent from the following description of exemplary embodiments with reference to the attached drawings.

DESCRIPTION OF THE EXEMPLARY EMBODIMENTS

A zoom lens and an image pickup apparatus including the zoom lens according to exemplary embodiments of the present invention will be described below.

Figure 1:
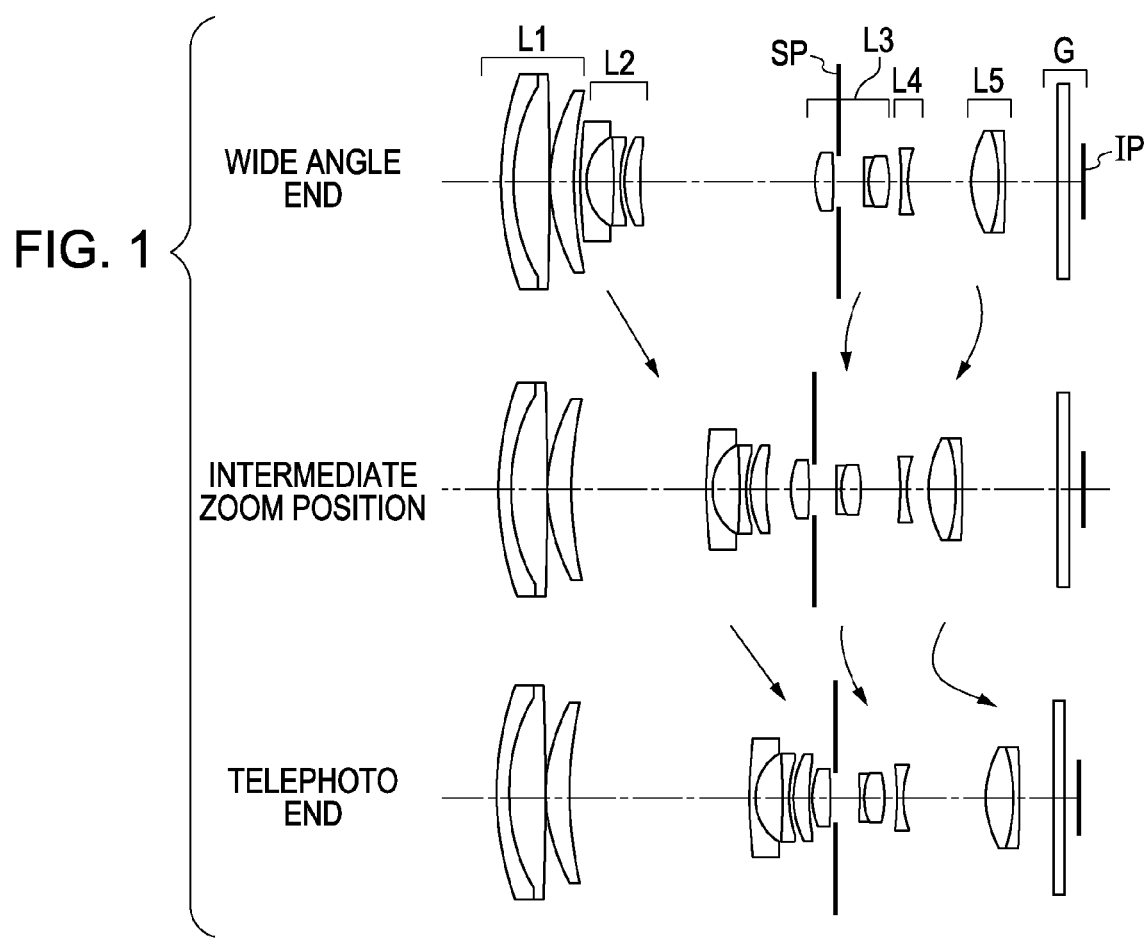
FIG. 1 is a cross-sectional view of a zoom lens according to a first exemplary embodiment of the present invention.
Figure 2:
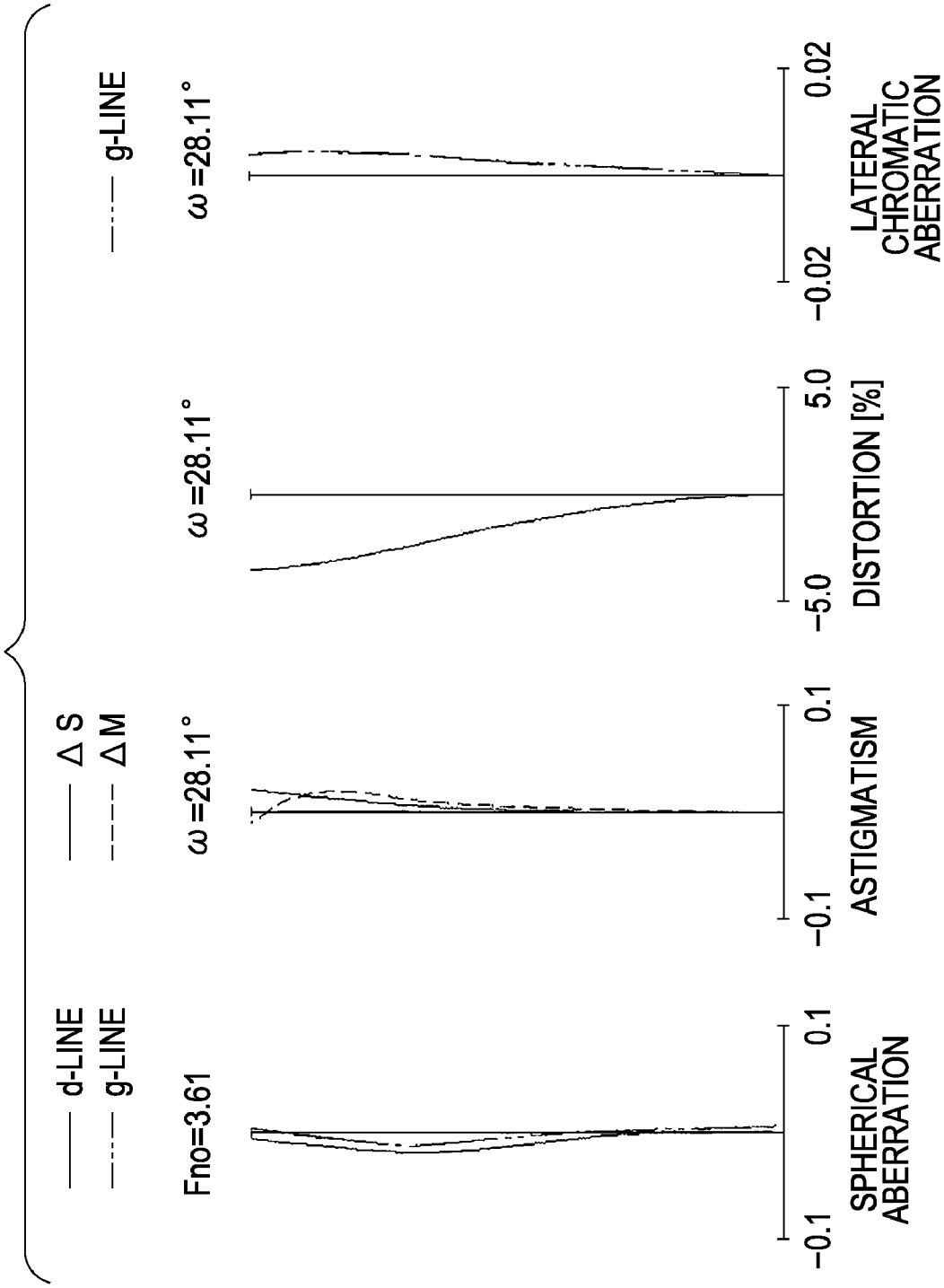
FIG. 2 includes aberration diagrams of the zoom lens at a wide angle end in a first numerical example according to the first exemplary embodiment.
Figure 3:
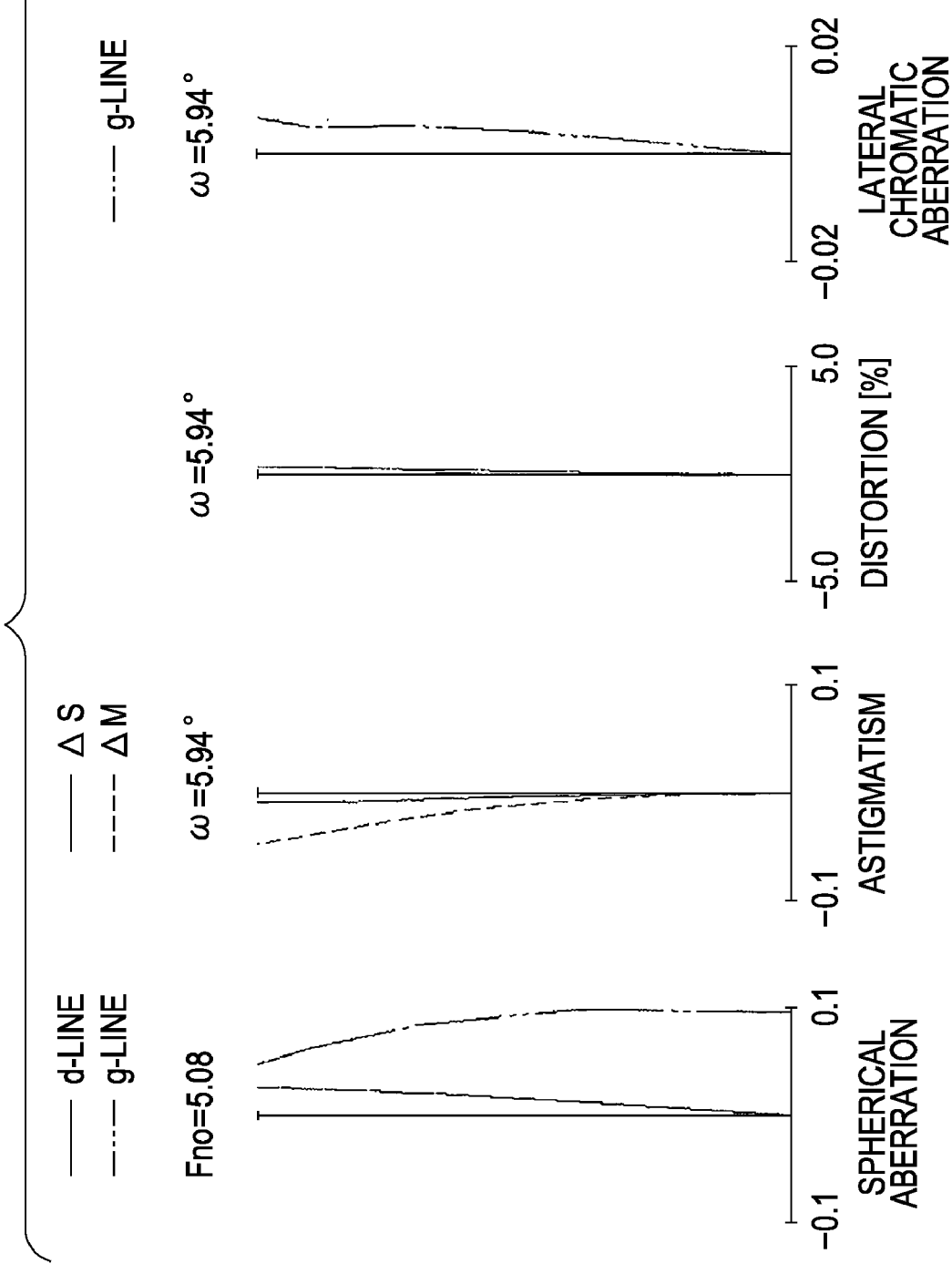
FIG. 3 includes aberration diagrams of the zoom lens at an intermediate zoom position in the first numerical example.
Figure 4:
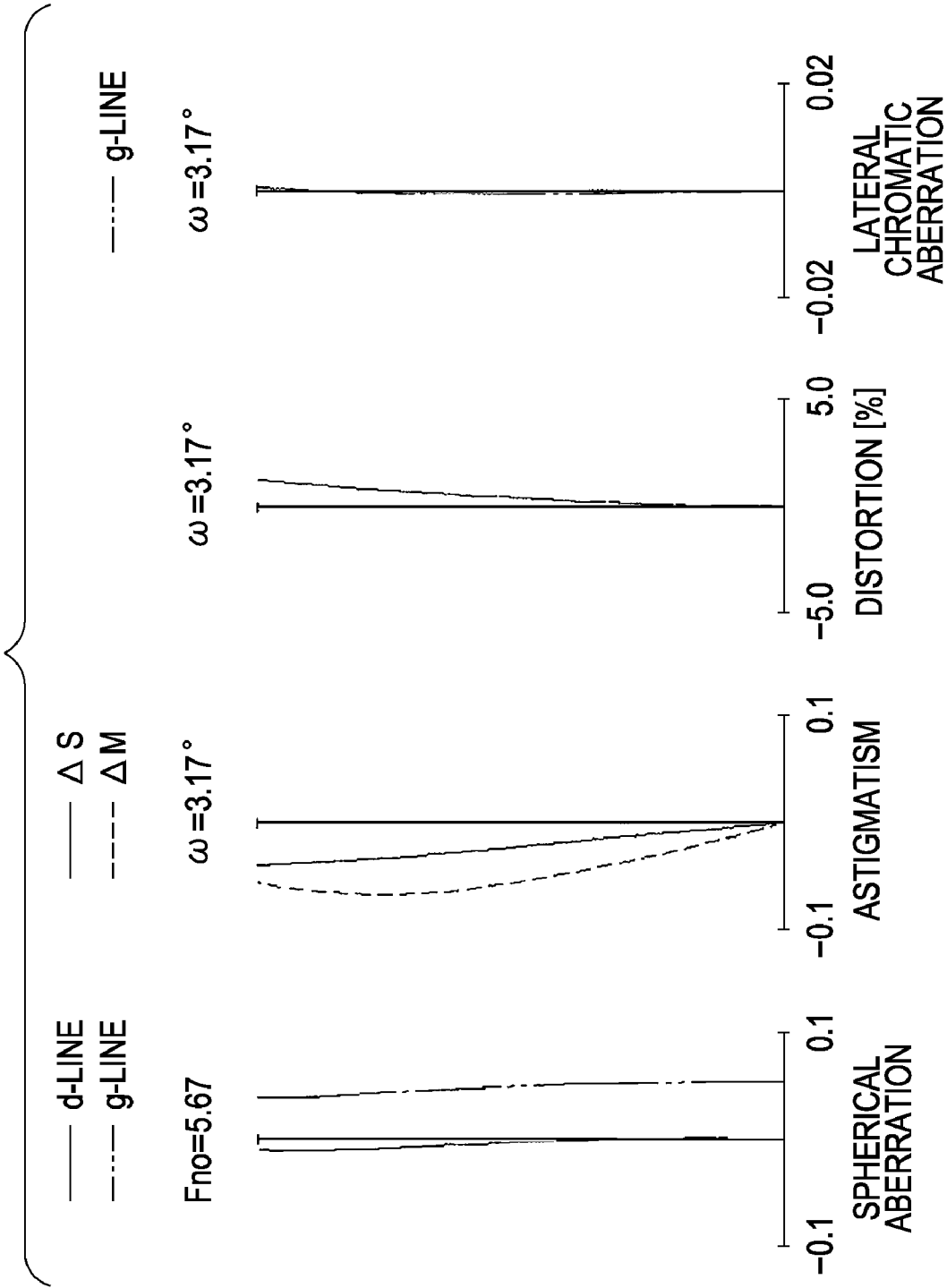
FIG. 4 includes aberration diagrams of the zoom lens at a telephoto end in the first numerical example.

FIG. 1 includes cross-sectional views of a zoom lens according to the first exemplary embodiment at a wide angle end (short focal-length end), at an intermediate zoom position, and at a telephoto end (long focal-length end). FIGS. 2, 3, and 4 respectively show longitudinal aberrations at the wide angle end, the intermediate zoom position, and the telephoto end in the first exemplary embodiment.

Figure 5:
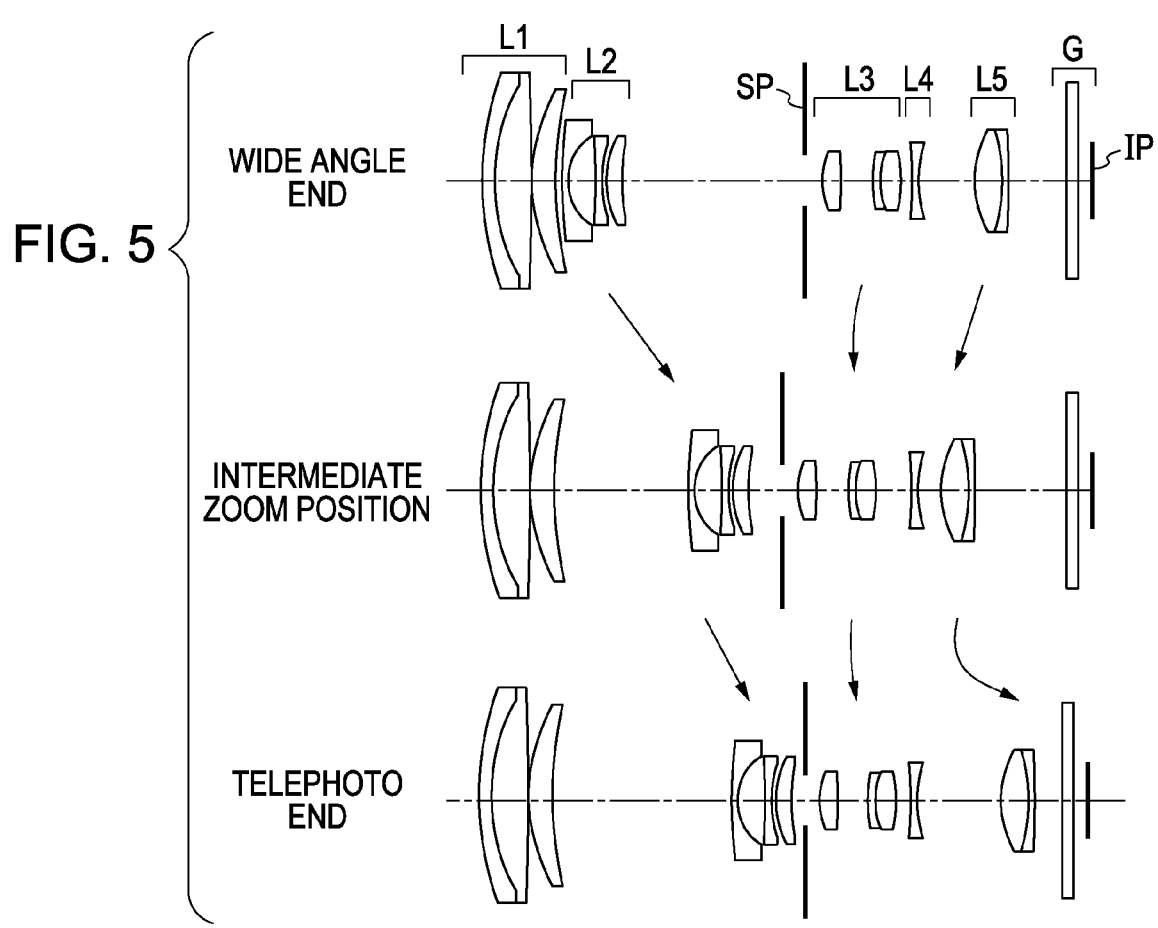
FIG. 5 is a cross-sectional view of a zoom lens according to a second exemplary embodiment.
Figure 6:
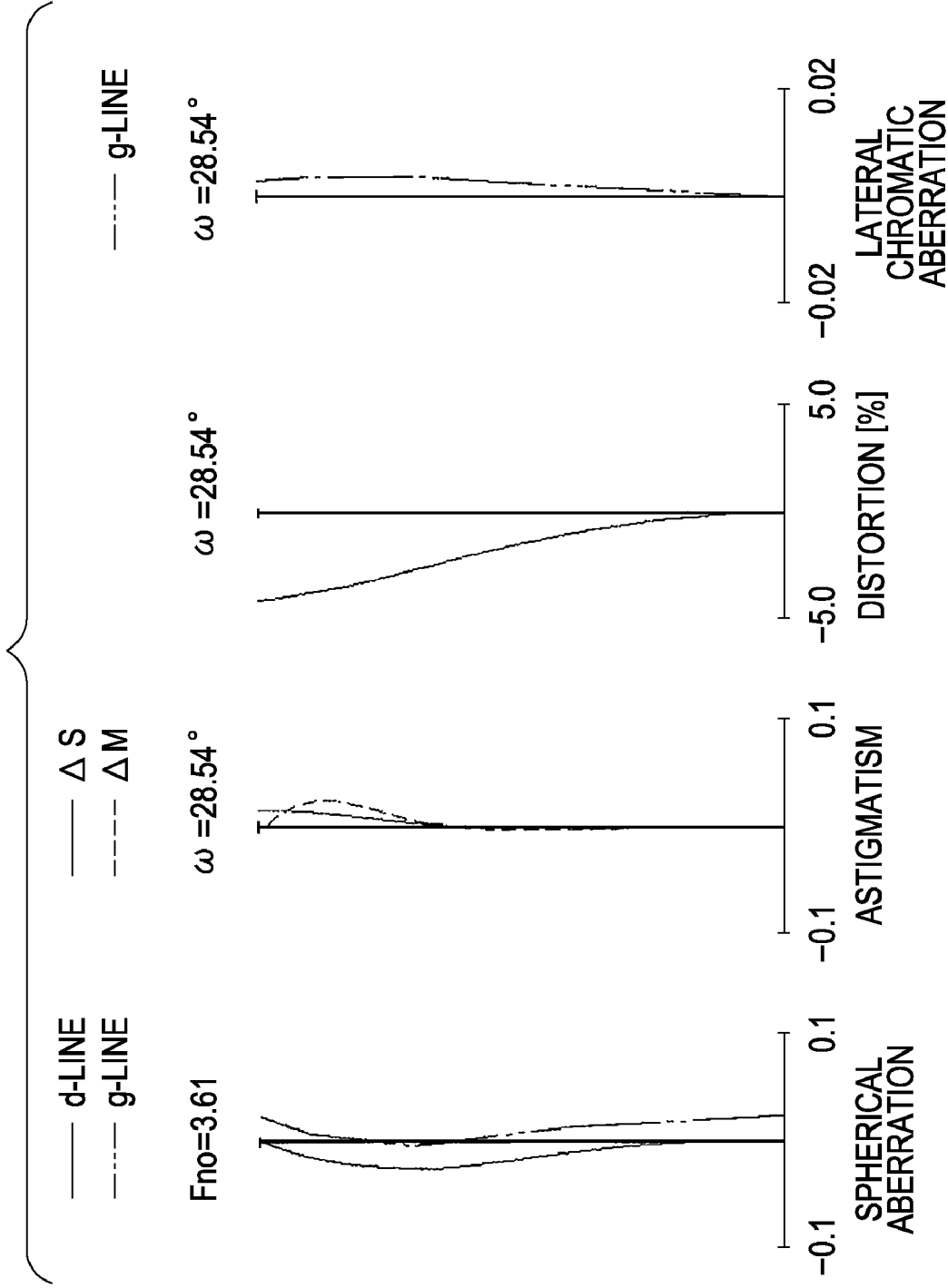
FIG. 6 includes aberration diagrams of the zoom lens at the wide angle end in a second numerical example according to the second exemplary embodiment.
Figure 7:
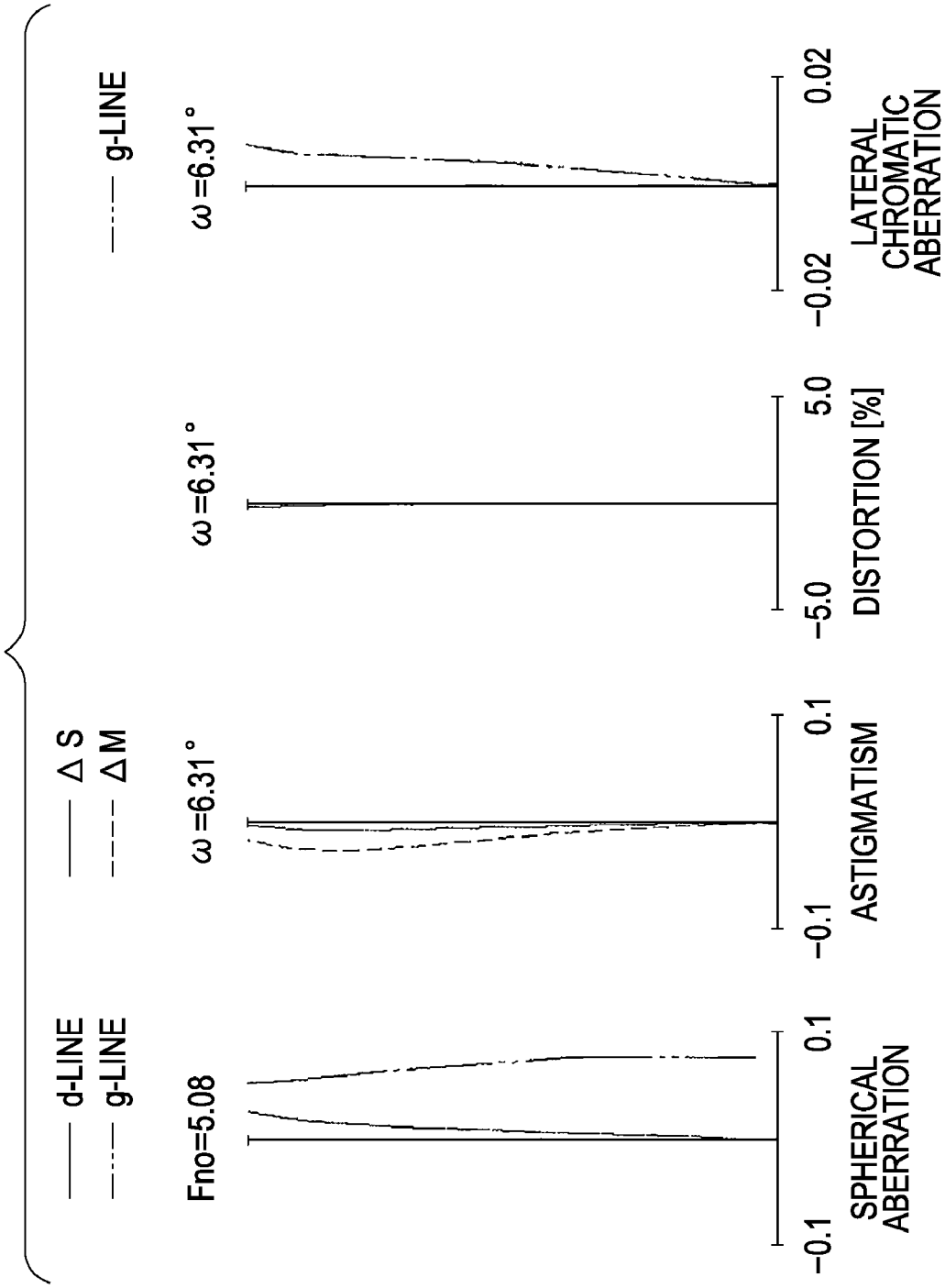
FIG. 7 includes aberration diagrams of the zoom lens at the intermediate zoom position in the second numerical example.
Figure 8:
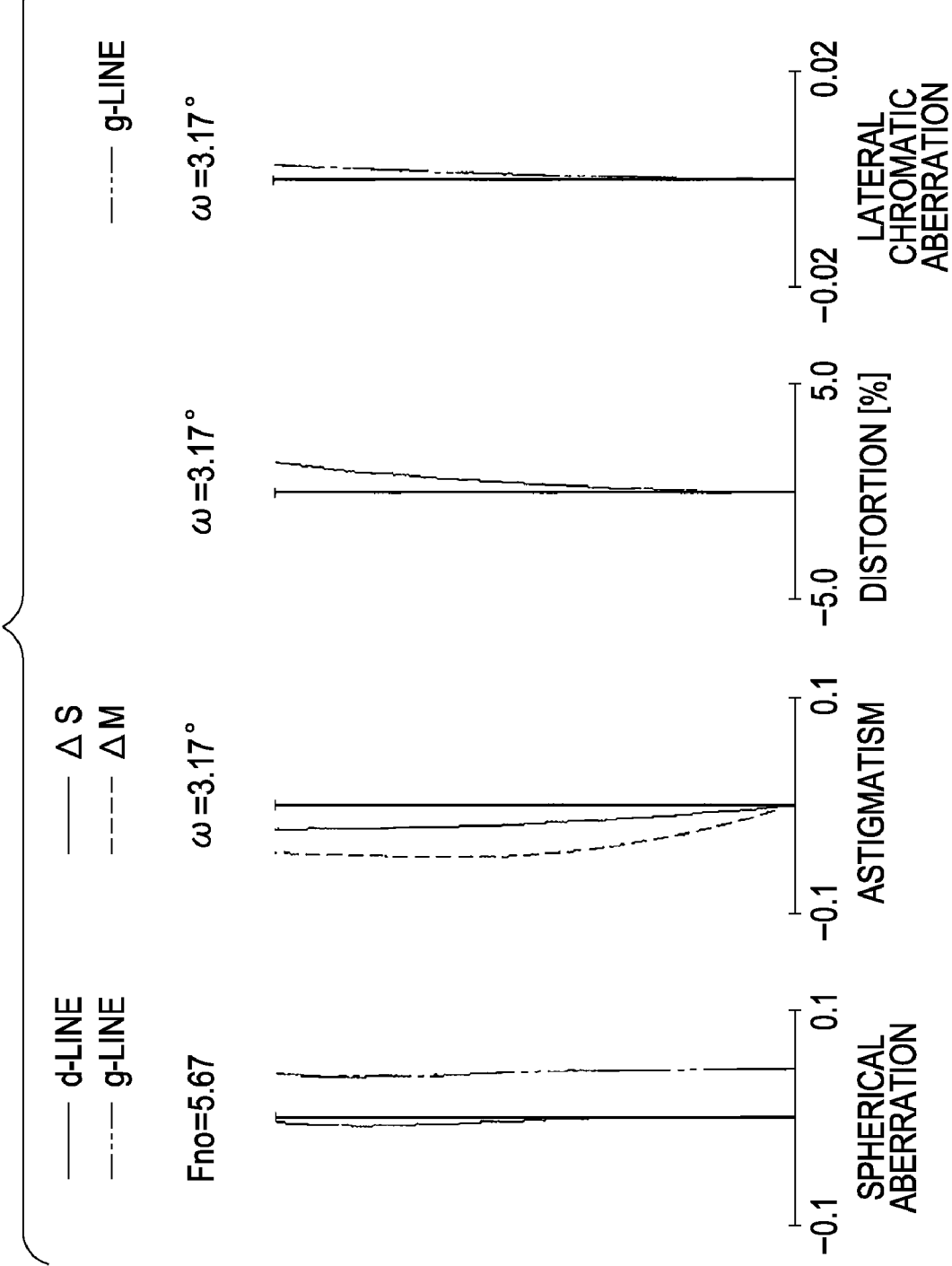
FIG. 8 includes aberration diagrams of the zoom lens at the telephoto end in the second numerical example.

FIG. 5 includes cross-sectional views of a zoom lens according to a second exemplary embodiment of the present invention at the wide angle end, at the intermediate zoom position, and at the telephoto end. FIGS. 6, 7, and 8 respectively show longitudinal aberrations at the wide angle end, the intermediate zoom position, and the telephoto end in the second exemplary embodiment.

Figure 9:
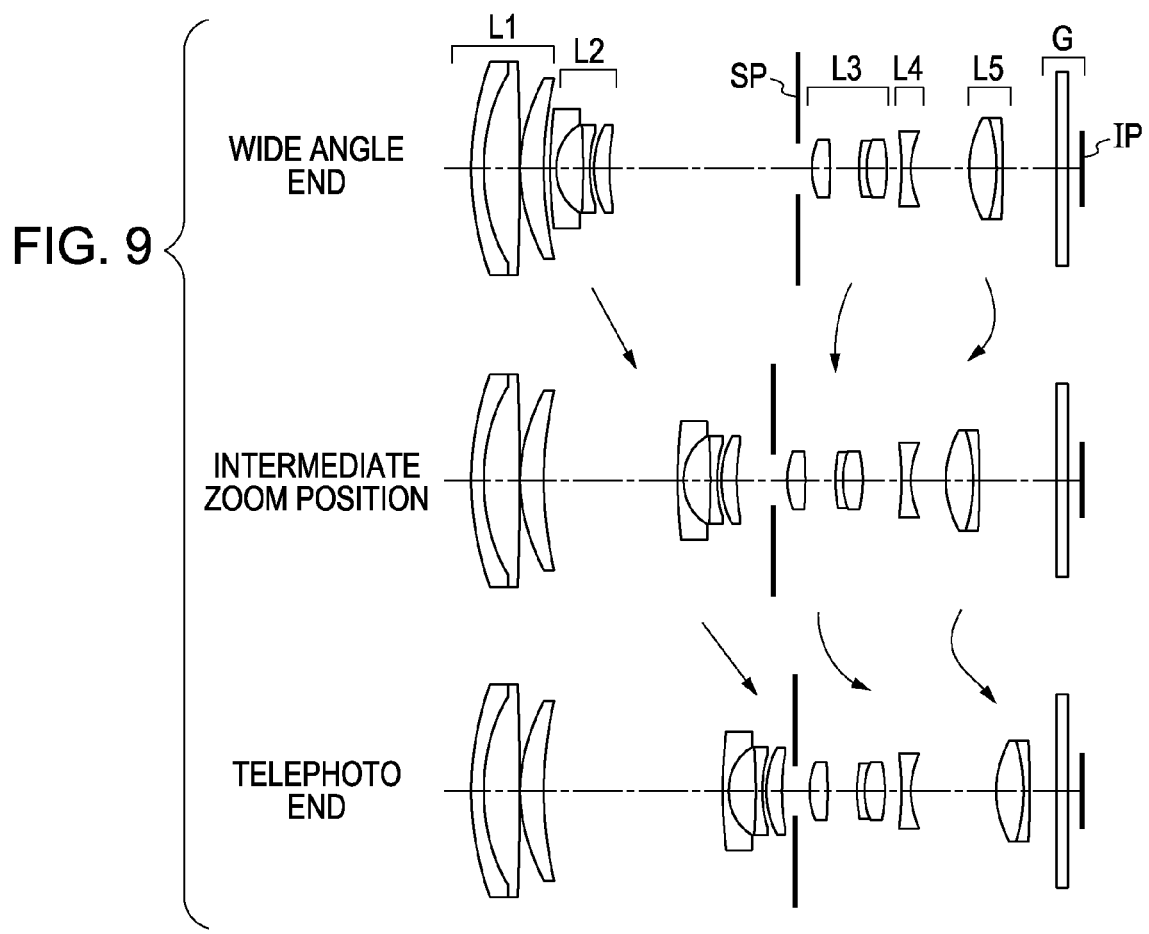
FIG. 9 is a cross-sectional view of a zoom lens according to a third exemplary embodiment of the present invention.
Figure 10:
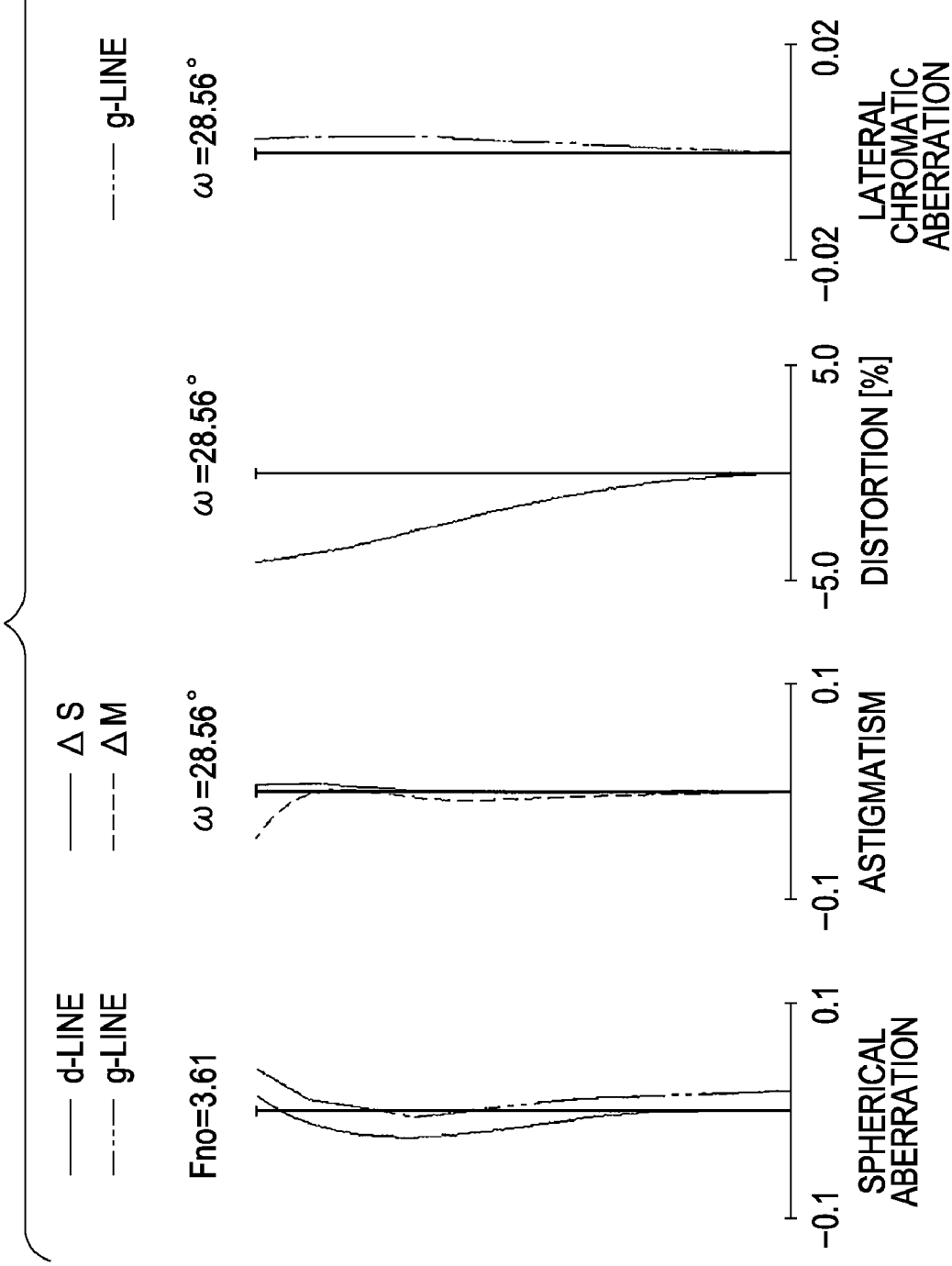
FIG. 10 includes aberration diagrams of the zoom lens at the wide angle end in a third numerical example according to the third exemplary embodiment.
Figure 11:
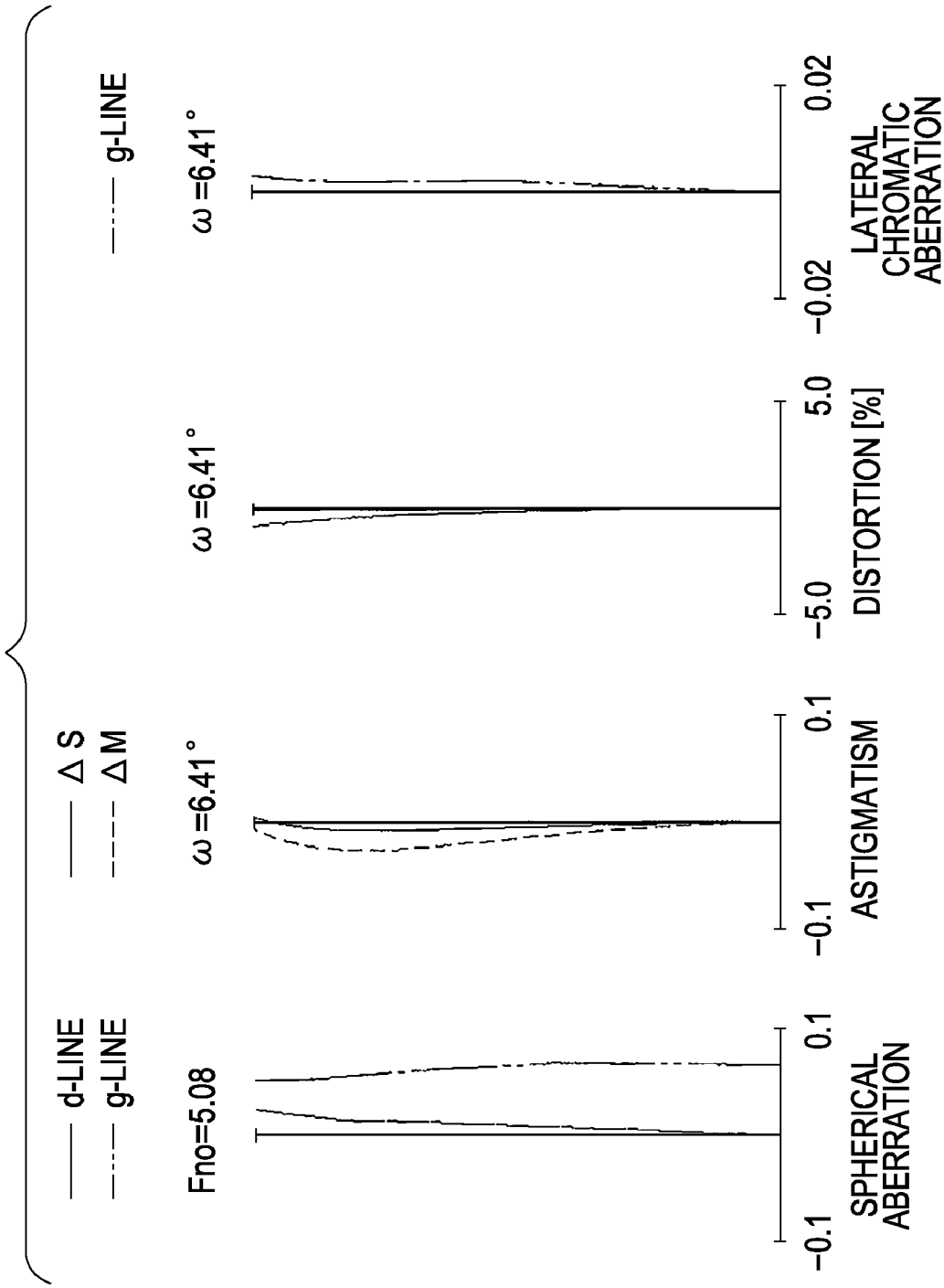
FIG. 11 includes aberration diagrams of the zoom lens at the intermediate zoom position in the third numerical example.
Figure 12:
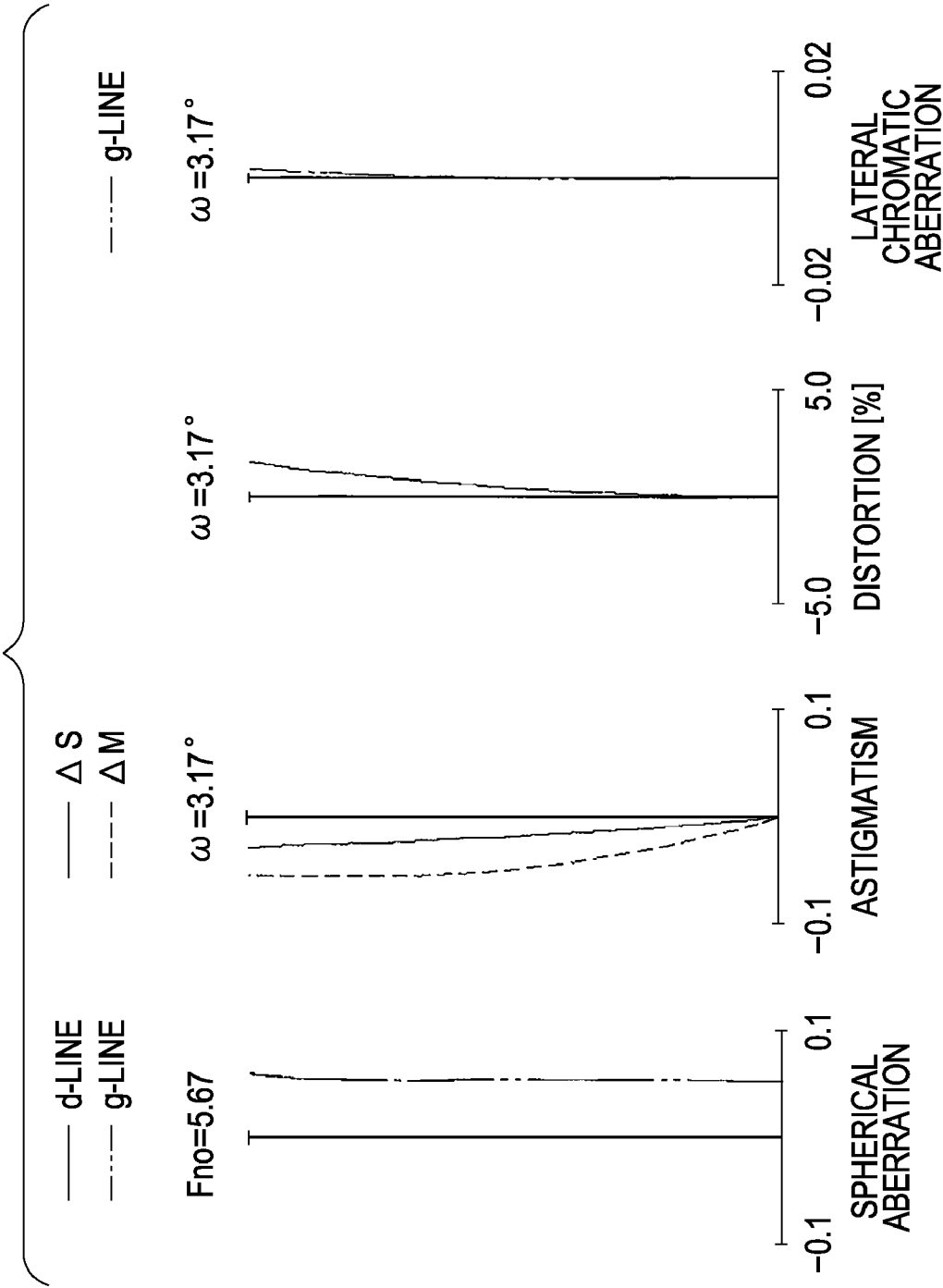
FIG. 12 includes aberration diagrams of the zoom lens at the telephoto end in the third numerical example.

FIG. 9 includes cross-sectional views of a zoom lens according to a third exemplary embodiment of the present invention at the wide angle end, at the intermediate zoom position, and at the telephoto end. FIGS. 10, 11, and 12 respectively show longitudinal aberrations at the wide angle end, the intermediate zoom position, and the telephoto end in the third exemplary embodiment.

Figure 13:
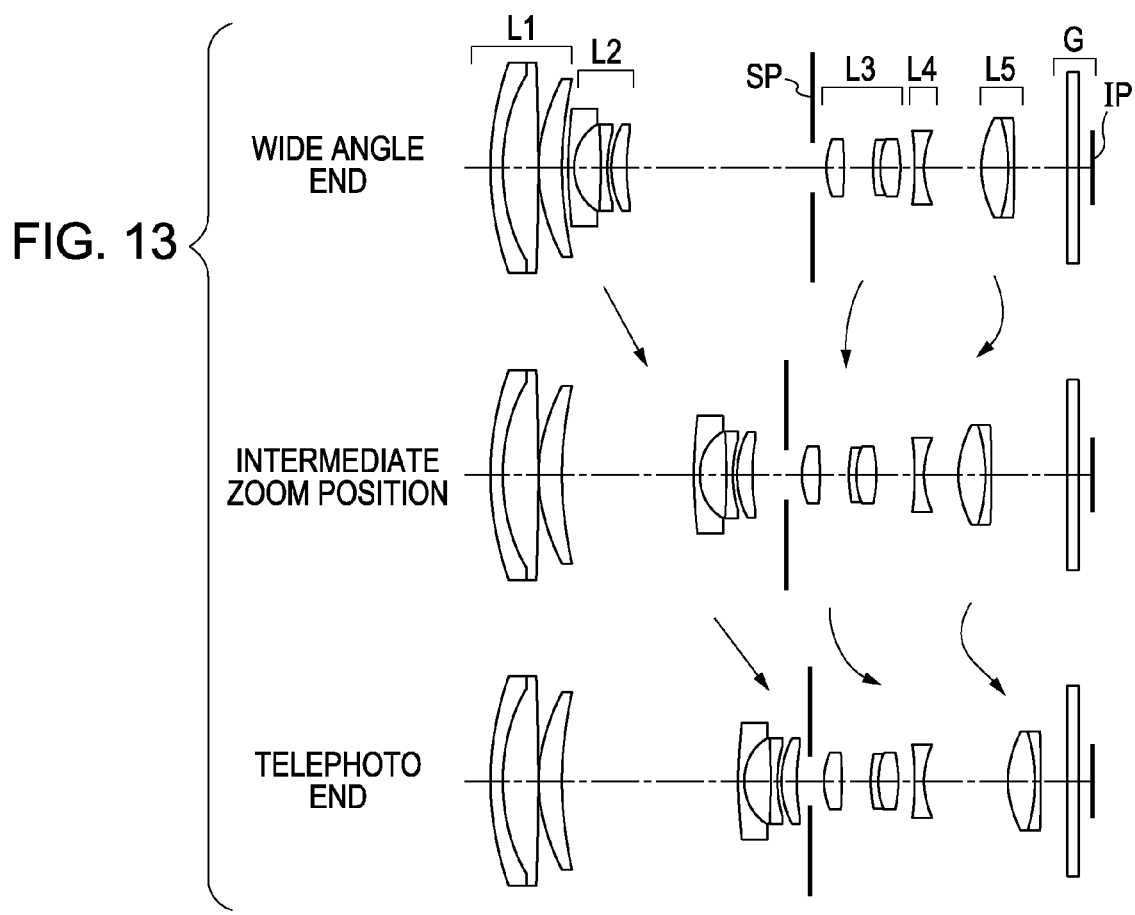
FIG. 13 is a cross-sectional view of a zoom lens according to a fourth exemplary embodiment of the present invention.
Figure 14:
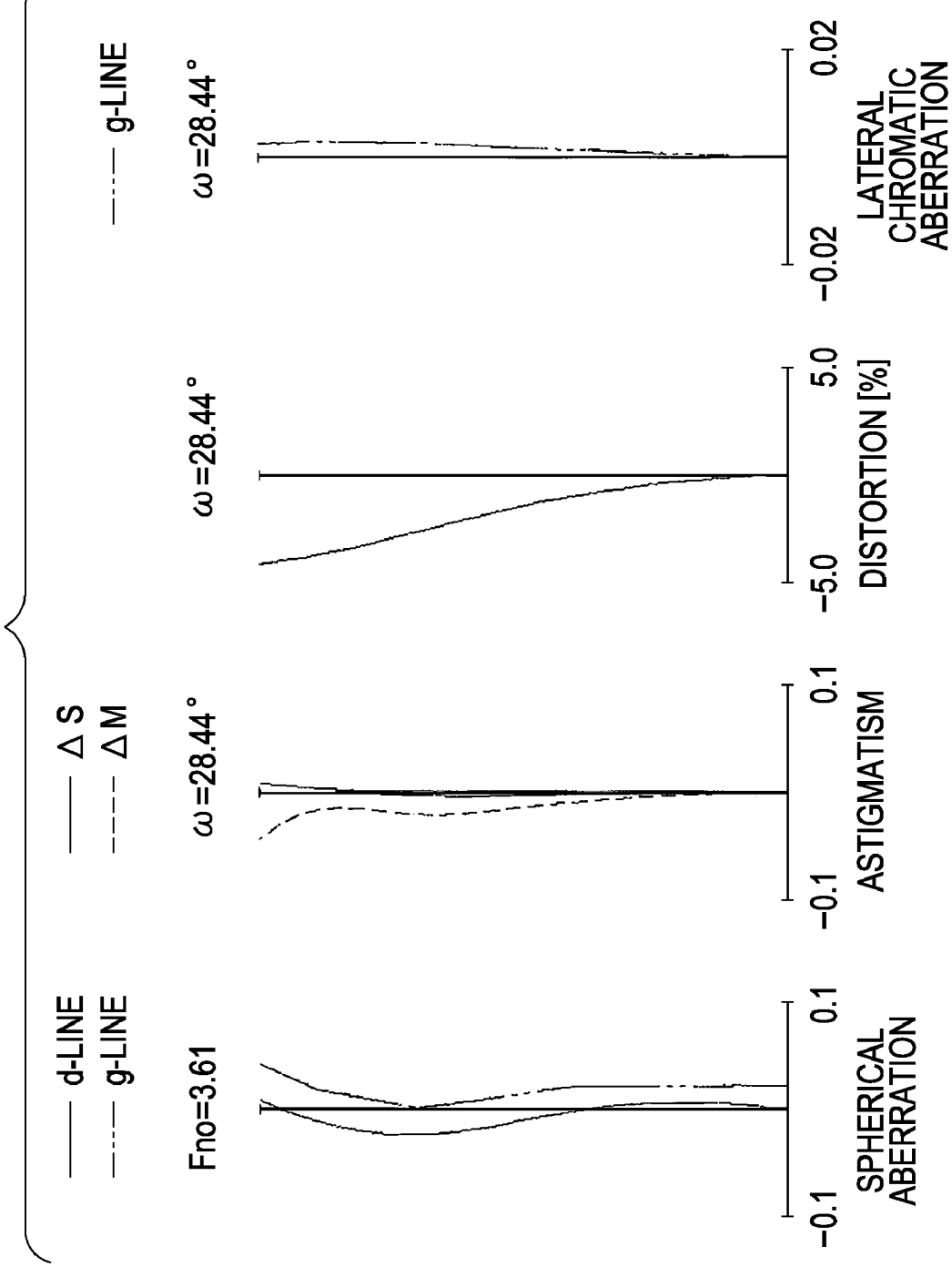
FIG. 14 includes aberration diagrams of the zoom lens at the wide angle end in a fourth numerical example according to the fourth exemplary embodiment.
Figure 15:
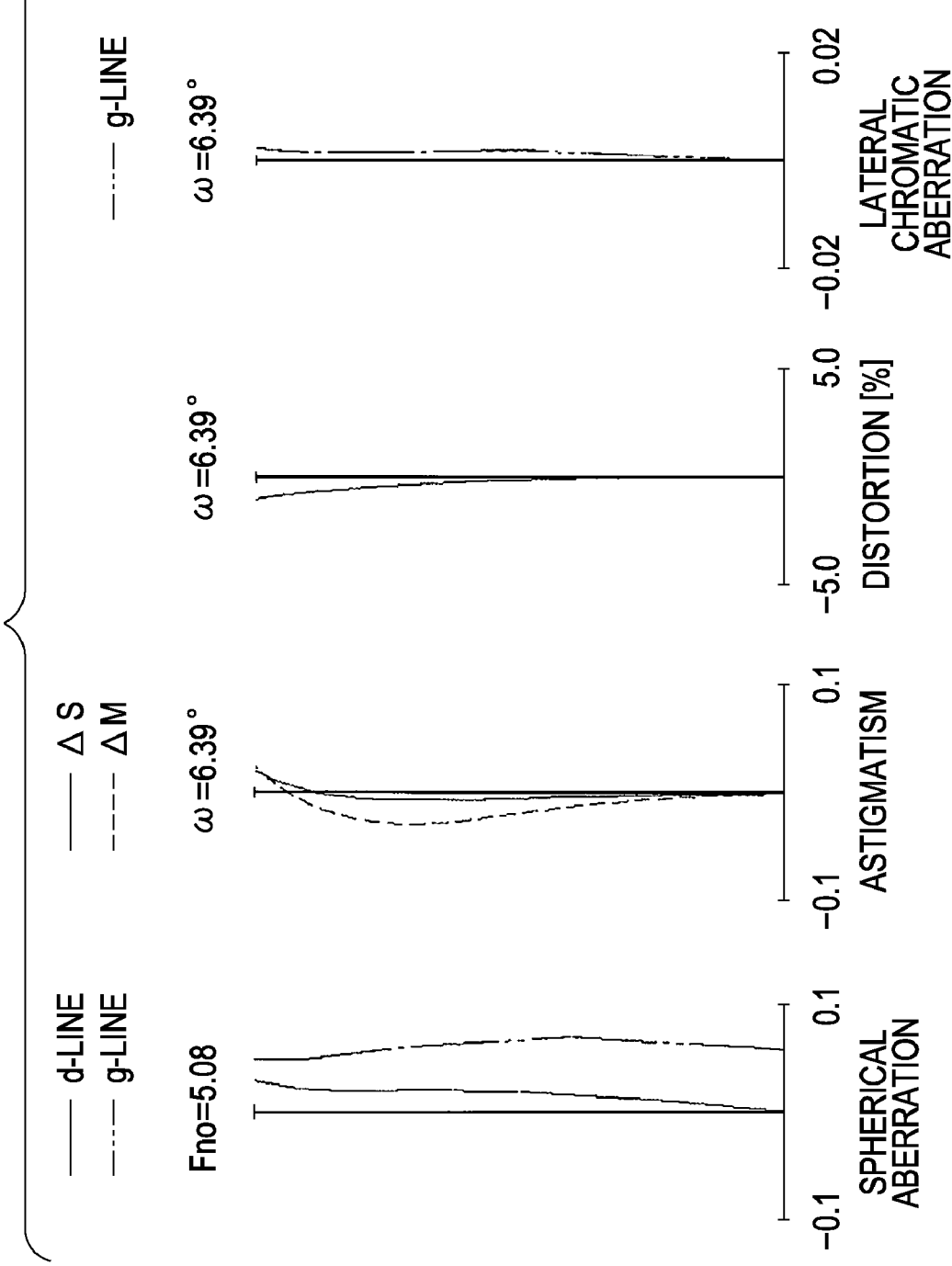
FIG. 15 includes aberration diagrams of the zoom lens at the intermediate zoom position in the fourth numerical example.
Figure 16:
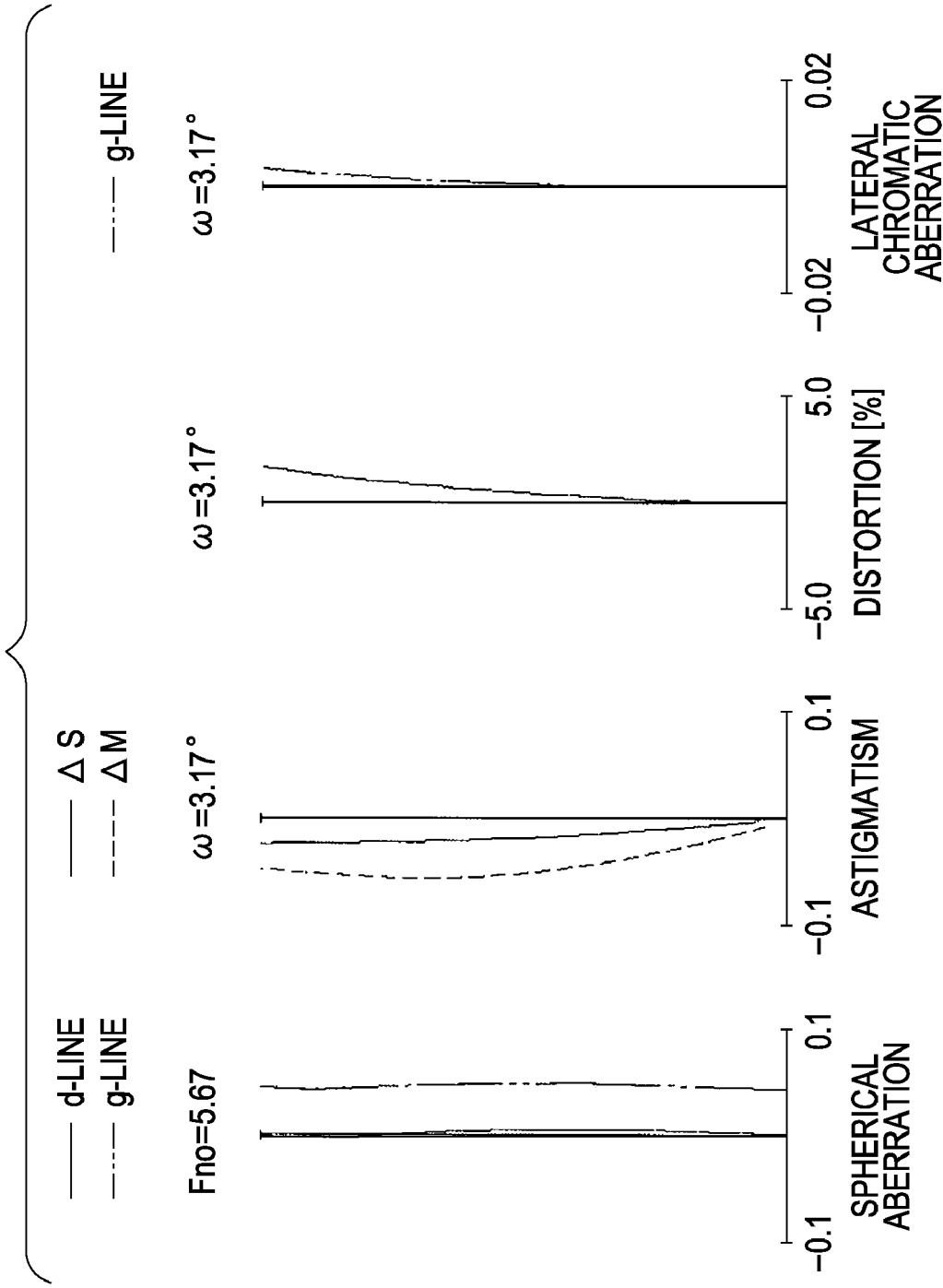
FIG. 16 includes aberration diagrams of the zoom lens at the telephoto end in the fourth numerical example.

FIG. 13 includes cross-sectional views of a zoom lens according to a fourth exemplary embodiment of the present invention at the wide angle end, at the intermediate zoom position, and at the telephoto end. FIGS. 14, 15, and 16 respectively show longitudinal aberrations at the wide angle end, the intermediate zoom position, and the telephoto end in the fourth exemplary embodiment.

Figure 17:
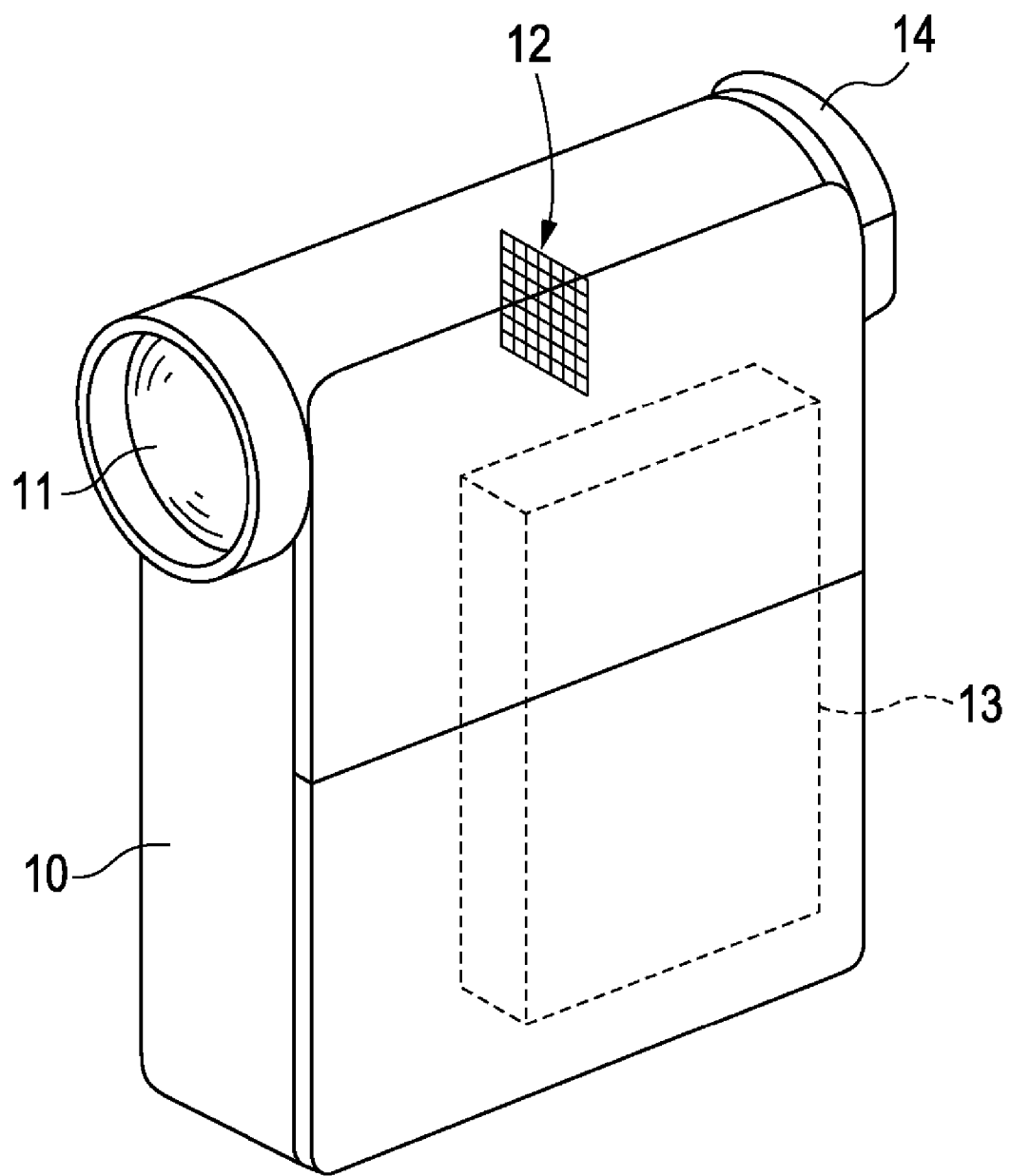
FIG. 17 is a schematic view showing the principal part of an image pickup apparatus according to the present invention.

FIG. 17 is a schematic view showing the principal part of a video camera (image pickup apparatus) including the zoom lens according to any of the exemplary embodiments of the present invention.

In the lens cross-sectional views, the left side is an object side (front) and the right side is an image side (rear).

The zoom lens according to each exemplary embodiment is an imaging lens system used in the image pickup apparatus.

As shown in the lens cross-sectional views, the zoom lens includes a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. Herein, the refractive power (optical power) is the reciprocal of the focal length.

The zoom lens also includes an aperture stop SP disposed in the third lens unit L3 or near the third lens unit L3 (object side or image side), and an optical block G corresponding to an optical filter, a face plate, or the like.

When the zoom lens is used as an imaging optical system of a video camera or a digital still camera, an image plane IP corresponds to an image pickup surface of a solid-state image pickup element (photoelectric transducer) such as a CCD sensor or a CMOS sensor. When the zoom lens is used in a silver halide film camera, the image plane IP corresponds to a photosensitive surface such as a film surface.

In the aberration diagrams, d and g respectively represent a d-line with a wavelength of about 587.56 nm and a g-line with a wavelength of about 435.8 nm, and ΔM and ΔS respectively represent a meridional image plane and a sagittal image plane. Lateral chromatic aberration is represented by the g-line. Fno represents the f-number, and ω represents the half field angle.

In each of the following exemplary embodiments, the wide angle end and the telephoto end refer to zoom positions provided when the lens unit L2 for zooming is positioned at opposite ends of a mechanical moving range in which the lens unit L2 is movable on the optical axis.

In the zoom lens according to each exemplary embodiment, in case of zooming from the wide angle end to the telephoto end, the second, third, and fifth lens units L2, L3, and L5 are moved, as shown by the arrows. Of course, the combination of the lens units to be moved for zooming is not limited to the above, and some of the five lens units can be moved to change the distances between the lens units. For example, the first, third, and fifth lens units, the second, third, fourth, and fifth lens units, the first, second, third, and fifth lens units, the second and fourth lens units, or all of the lenses can be moved.

More specifically, during zooming, the second lens unit L2 is moved to the image side, and the third lens unit L3 is moved to the object side along a path including a convex portion.

The fifth lens unit L5 is moved to correct deflection of the image plane due to zooming. This zooming method increases the zoom ratio of the zoom lens.

A rear focus method in which focusing is performed by moving the fifth lens unit L5 on the optical axis is adopted.

The fourth lens unit L4 is formed by one lens component composed of a single lens or a cemented lens and having a negative refractive power. The fourth lens unit L4 is moved in a direction having a component that is perpendicular to the optical axis, thereby changing the image forming position of the entire system perpendicularly to the optical axis.

Since the fourth lens unit L4 having a negative refractive power serves as an image stabilizing lens unit in this way, the outer diameter of the lens is made smaller than when a lens unit having a positive refractive power is used. This reduces the size of the image stabilizing unit.

The aperture stop SP is disposed in the third lens unit L3, or in front of or in the rear of the third lens unit L3. During zooming, the aperture stop SP moves together with the third lens unit L3. When the aperture stop SP is disposed in the third lens unit L3, the distance between the second lens unit L2 and the third lens unit L3 at the telephoto end is decreased. Therefore, the overall length of the zoom lens can be shortened easily.

When the aperture stop SP is disposed on the object side of the third lens unit L3, the distance between the aperture stop SP and the first lens unit L1 is decreased. This is advantageous in reduction of the diameter of the front lens system.

Each exemplary embodiment satisfies at least one of the following conditional expressions:

$$63 < \nu 4 \tag{1}$$

$$D4/fw < 0.3 \tag{2}$$

$$0.2 < (R4a + R4b)/(R4a - R4b) < 1.0 \tag{3}$$

$$1.0 < |f4|/fw < 4.0 \tag{4}$$

$$-1.2 < (1 - \beta_4) \times \beta_5 < -0.4 \tag{5}$$

$$1 \times 10^{-4} < x/|f4| < 1 \times 10^{-2} \tag{6}$$

$$3.0 < f1/fw < 6.0 \tag{7}$$

$$0.9 < |f2|/fw < 1.4 \quad (8)$$

$$1.5 < f3/fw < 2.5 \quad (9)$$

$$1.5 < f5/fw < 3.0 \quad (10)$$

where i represents the order number of the lens unit counted from the object side to the image side, fi represents the focal length of the i-th lens unit, fw represents the focal length of the entire system at the wide angle end, ν4 represents the Abbe number of the material of the negative lens that forms the fourth lens unit L4, D4 represents the thickness of the fourth lens unit L4 on the optical axis, R4a represents the radius of curvature of a lens surface of the fourth lens unit L4 closest to the object side, R4b represents the radius of curvature of a lens surface of the fourth lens unit L4 closest to the image side, β4 and β5 respectively represent the lateral magnifications of the fourth lens unit L4 and the fifth lens unit L5, and x represents the maximum amount of displacement of an aspherical surface of the fourth lens unit L4 from the reference spherical surface.

Advantages are achieved by satisfying the conditional expressions. Technical meanings of the conditional expressions will now be described.

Conditional Expression 1 defines the Abbe number of the material of the negative lens that forms the fourth lens unit L4. If the Abbe number is below the lower limit, dispersion becomes too large, and chromatic aberration greatly varies during correction of image blurring (image stabilization). Consequently, the chromatic aberration is not corrected sufficiently.

Conditional Expression 2 defines the thickness of the fourth lens unit L4 in the optical axis direction. If the thickness D is above the upper limit, the effect obtained by forming the fourth lens unit L4 by one component is lessened, and the size of the image stabilizing unit is increased.

Conditional Expression 3 defines the shape factor of the fourth lens unit L4. If the shape factor is less than the lower limit and the curvature of the object-side surface is becomes too small, an excessive spherical aberration occurs.

If the shape factor exceeds 1 as the upper limit in Conditional Expression 3, the fourth lens unit L4 has a meniscus shape with a concave surface pointing toward the image side. When the degree of the meniscus is excessively high, the front principal point of the fourth lens unit L4 is too close to the image side. Therefore, it is difficult to ensure an air gap between the third lens unit L3 and the fourth lens unit L4.

Conditional Expression 4 defines the focal length, that is, the negative refractive power, of the fourth lens unit L4. When the focal length is less than the lower limit and the negative refractive power becomes too strong, if the number of lenses that constitute the lens unit is small, the Petzval sum becomes too small on the negative side, and a large field curvature occurs. In contrast, when the focal length is more than the upper limit and the negative refractive power becomes too weak, the radial size of the fourth lens unit L4 is increased by a decrease in vibration control sensitivity. Further, a light beam emitted from the fourth lens unit L4 easily converges. Consequently, the focusing sensitivity of the fifth lens unit L5 is lowered, and the amount of movement of the fifth lens unit L5 during focusing is increased.

Conditional Expression 5 relates to the vibration control sensitivity of the fourth lens unit L4. In this expression, $(1-\beta 4) \times \beta 5$ represents the ratio of the amount of shift of the component of the fourth lens unit L4 perpendicular to the optical axis and the amount of shift of the image point on the image plane. As this ratio increases, the amount by which the image point can be shifted decreases.

When the vibration control sensitivity is below the lower limit, the moving stroke (moving amount) for image stabilization (image shift) increases, and the effective diameter of the fourth lens unit L4 increases. This increases the size of the lens holder and the image stabilizing mechanism.

In contrast, when the vibration control sensitivity is above the upper limit, the fourth lens unit L4 is driven minutely during image stabilization. In this case, it is difficult to precisely control the driving of the fourth lens unit L4.

Conditional Expression 6 defines the maximum aspherical amount of the negative lens of the fourth lens unit L4. The aspherical shape of the negative lens is determined so that the negative refractive power gradually decreases away from the optical axis, thereby correcting eccentric coma aberration and tilting of the image plane during image stabilization.

When the aspherical amount is too small below the lower limit in Conditional Expression 6, aberration correction is not sufficient during image stabilization, and the effect of the aspherical surface is not obtained. In contrast, when the aspherical amount is too large above the upper limit, eccentric aberration is overcorrected.

Conditional Expression 7 defines the focal length, that is, the refractive power, of the first lens unit L1. When the focal length is less than the lower limit and the refractive power is too strong, spherical aberration frequently occurs at the telephoto end. In contrast, when the focal length is more than the upper limit and the refractive power is too weak, it is difficult to set the lateral magnification of the second lens unit L2 at 1× at the intermediate zoom position. The moving amount of the fifth lens unit L5 for correcting an image plane variation is limited by setting the lateral magnification of the second lens unit L2 at 1× at the intermediate zoom position. However, when the focal length exceeds the upper limit, the moving amount of the fifth lens unit L5 increases.

Conditional Expression 8 defines the focal length, that is, the refractive power, of the second lens unit L2. When the focal length is less than the lower limit and the refractive power is too strong, an aberration change caused in the second lens unit L2 by zooming increases.

In particular, changes in spherical aberration, coma aberration, and curvature of field increase. When the focal length is more than the upper limit and the refractive power is too weak, the moving amount of the second lens unit L2 for obtaining a desired zoom ratio increases, the total length of the lens increases, and the diameter of the front lens increases.

Conditional Expression 9 defines the focal length, that is, the refractive power, of the third lens unit L3. When the focal length is less than the lower limit and the refractive power is too strong, the Petzval sum excessively increases in the positive direction, and an under-correction of the curvature of field occurs. In contrast, when the focal length is more than the upper limit and the refractive power is too weak, the total length of the lens increases.

Conditional Expression 10 defines the focal length, that is, the refractive power, of the fifth lens unit L5. When the focal length is less than the lower limit and the refractive power is too strong, it is difficult to ensure a back focus having a length necessary for insertion of a filter or the like. In contrast, when the focal length is more than the upper limit and the refractive power is too weak, the moving amount of the fifth lens unit L5 for correction of an image plane variation due to zooming and for focusing increases.

The numerical values in Conditional Expressions 1 to 10 should be set within the following ranges:

$$64 < \nu 4 \quad (1a)$$

$$D4/fw < 0.2 \quad (2a)$$

$$0.3 < (R4a+R4b)/(R4a-R4b) < 0.8 \quad (3a)$$

$$1.5 < |f4|/fw < 3.5 \quad (4a)$$

$$-1.1 < (1-\beta 4) \times \beta 5 < -0.5 \quad (5a)$$

$$1.2 \times 10^{-4} < x/|f4| < 5 \times 10^{-3} \quad (6a)$$

$$4.0 < f1/fw < 5.4 \quad (7a)$$

$$1.0 < |f2|/fw < 1.3 \quad (8a)$$

$$1.6 < f3/fw < 2.2 \quad (9a)$$

$$1.7 < f5/fw < 2.6 \quad (10a)$$

Lens configurations of the lens units in each exemplary embodiment will be described below.

The first lens unit L1 includes a cemented lens formed by a negative lens and a positive lens, and a positive lens. The cemented lens and the positive lens are arranged in that order from the object side to the image side. This lens configuration allows longitudinal chromatic aberration, lateral chromatic aberration, and spherical aberration to be properly corrected while maintaining a high zoom ratio.

The second lens unit L2 includes three lenses, that is, a negative meniscus lens having a concave surface on the image side, a negative biconcave lens, and a positive meniscus lens having a convex surface on the object side, which lenses are arranged in that order from the object side to the image side. The positive lens is formed of a highly dispersive material so as to properly correct a change in chromatic aberration resulting from zooming.

The third lens unit L3 includes three lenses, that is, a positive lens having a convex surface on the object side, a negative meniscus lens having a concave surface on the image side, and a positive biconvex lens, which lenses are arranged in that order from the object side to the image side. By forming a space between the positive lens on the object side and the negative meniscus lens, the entire third lens unit L3 has a telephoto structure, the distance between the principal points of the second lens unit L2 and the third lens unit L3 is shortened, and the total length of the zoom lens is shortened.

The fourth lens unit L4 is formed by one negative lens. In the fourth exemplary embodiment, a resin layer having an aspherical surface on the image side is added to the image side of the negative lens. In each exemplary embodiment, the fourth lens unit L4 is fixed during zooming. This can reduce a change in chromatic aberration caused in the fourth lens unit L4 by zooming.

When the refractive power of the negative lens of the fourth lens unit L4 is strengthened, spherical aberration occurs. This spherical aberration is corrected by an air lens having a positive refractive power and defined by the final lens surface of the third lens unit L3 and an object-side lens surface of the fourth lens unit L4. When the negative refractive power of the fourth lens unit L4 is strengthened, pincushion distortion occurs at an image-side lens surface of the lens unit. This pincushion distortion is corrected by an air lens having a negative refractive power and defined by the image-side lens surface of the fourth lens unit L4 and a lens surface of the fifth lens unit L5 closest to the image side.

The fifth lens unit L5 is formed by a cemented lens having a positive refractive power and constituted by a positive lens and a negative lens. This configuration suppresses a change in chromatic aberration resulting from correction of an image plane variation.

In the exemplary embodiments, image blurring (displacement of an image position) caused by vibration of the entire optical system (zoom lens) is corrected by moving the fourth lens unit L4 in the direction having a component that is perpendicular to the optical axis. This allows image stabilization to be performed without adding an optical member, such as a variable-apex prism, and a lens unit for image stabilization.

The fourth lens unit L4 is formed by one component so as to reduce the size and weight of the image stabilizing unit. This reduces the size and weight of the image stabilizing mechanism and saves the power for driving the fourth lens unit L4.

In order to reduce changes in chromatic aberration during image stabilization, it is necessary that chromatic aberration at the fourth lens unit L4 should be sufficiently small. When the fourth lens unit L4 is formed by one lens, it can be made of a low-dispersion glass material in order to suppress chromatic aberration. Further, in order to suppress eccentric coma aberration and tilting of the image plane during image stabilization, it is necessary that spherical aberration and coma aberration at the fourth lens unit L4 should be sufficiently small.

These various aberrations are properly corrected with a small number of lenses by appropriately setting the aspherical surface in the fourth lens unit L4.

With the above structure, performance is enhanced by forming the image stabilizing unit only by one lens component.

The fourth lens unit L4 can be formed by a replica aspherical lens in which a thin resin layer having an aspherical shape is provided on a spherical lens. In this case, the fourth lens unit L4 can be manufactured more easily than when it is formed as a glass-molded lens.

The refractive powers of the first lens unit L1 and the second lens unit L2 are strengthened to some extent for the purpose of size reduction of the optical system. This increases secondary spectra of longitudinal chromatic aberration and lateral chromatic aberration at the first lens unit L1 at the telephoto end.

Accordingly, these secondary spectra are properly corrected by using a low-dispersion material, which has a high partial dispersion ratio, for the positive lens that constitutes the cemented lens of the first lens unit L1.

The aperture diameter of the aperture stop SP is changed with zooming. The aperture diameter of the aperture stop SP is the largest at the wide angle end, and decreases toward the intermediate zoom position and the telephoto end. This lowers the height at which off-axis rays pass through the front lens from the intermediate zoom position to the telephoto end, and thereby reduces the diameter of the front lens.

As described above, according to the exemplary embodiments, the zoom lens includes five lens units, that is, a lens unit having a positive refractive power, a lens unit having a negative refractive power, a lens unit having a positive refractive power, a lens unit having a negative refractive power, and a lens unit having a positive refractive power. While the zoom lens provides a high zoom ratio, the diameter of the front lens is small, and aberrations can be properly corrected over the entire zoom range. Moreover, the size of the zoom lens can be reduced, and aberrations during image stabilization can be corrected properly.

An optical filter or a lens unit having a small refractive power may be added to the object side of the first lens unit L1 or the image side of the fifth lens unit L5.

Further, a teleconverter lens or a wide converter lens may be placed on the object side or the image side.

An example of a video camera (image pickup apparatus) in which the zoom lens according to any of the exemplary embodiments of the present invention is used as an imaging optical system will now be described with reference to FIG. 17.

Referring to FIG. 17, the video camera includes a video camera body 10, an imaging optical system 11 formed by the zoom lens according to the exemplary embodiment, an image pickup element 12, such as a CCD, which receives an object image from the imaging optical system 11, a recording unit 13 that records the object image received by the image pickup element 12, and a finder 14 through which the object image displayed on a display element (not shown) is viewed. The display element is, for example, a liquid crystal panel, and the object image formed on the image pickup element 12 is displayed on the display element.

By thus applying the zoom lens of the exemplary embodiment to the image pickup apparatus such as a video camera, the image pickup apparatus can have a small size and high optical performance.

The zoom lens according to the exemplary embodiments can also be applied to a digital camera. The following first to fourth numerical examples correspond to the above-described first to fourth exemplary embodiments.

In the numerical examples, i represents the order number of the lens surface from the object side, Ri represents the radius of curvature of the lens surface, Di represents the lens thickness and air gap between the i-th lens surface and the i+1-th lens surface, and Ni and vi respectively represent the refractive index and the Abbe number for the d-line. Two surfaces closest to the image side are formed of filter members such as a crystal low-pass filter and an infrared cut-off filter. B, C, D, and E are aspherical coefficients. The aspherical shape given by the following expression:

$$X = \frac{(1/R)H^2}{1 + \sqrt{1 - (1+K)(H/R)^2}} + BH^4 + CH^6 + DH^8 + EH^{10}$$

where X represents the displacement from the vertex of the surface in the optical axis direction at the height H from the optical axis, R represents the radius of curvature, and K is a conic constant.

First Numerical Example
f = 6.69-64.60   Fno = 3.60-5.67   2ω = 53.2°-5.9°

| | | | |
|---|---|---|---|
| R1 = 33.964 | D1 = 1.30 | N1 = 1.805181 | v1 = 25.4 |
| R2 = 21.459 | D2 = 4.00 | N2 = 1.496999 | v2 = 81.5 |
| R3 = −176.329 | D3 = 0.10 | | |
| R4 = 19.846 | D4 = 2.40 | N3 = 1.603112 | v3 = 60.6 |
| R5 = 51.461 | D5 = variable | | |
| R6 = 41.993 | D6 = 0.70 | N4 = 1.882997 | v4 = 40.8 |
| R7 = 5.801 | D7 = 3.07 | | |
| R8 = −26.431 | D8 = 0.60 | N5 = 1.696797 | v5 = 55.5 |
| R9 = 20.477 | D9 = 0.40 | | |
| R10 = 11.001 | D10 = 1.70 | N6 = 1.922860 | v6 = 18.9 |
| R11 = 28.281 | D11 = variable | | |
| R12 = 10.496 | D12 = 1.80 | N7 = 1.693500 | v7 = 53.2 |
| R13 = aperture stop | D13 = 0.70 | | |

-continued

First Numerical Example
f = 6.69-64.60   Fno = 3.60-5.67   2ω = 53.2°-5.9°

| | | | |
|---|---|---|---|
| R14 = −35.835 | D14 = 3.42 | | |
| R15 = 49.037 | D15 = 0.60 | N8 = 1.846660 | v8 = 23.9 |
| R16 = 8.281 | D16 = 0.18 | | |
| R17 = 12.002 | D17 = 1.70 | N9 = 1.603112 | v9 = 60.6 |
| R18 = −18.402 | D18 = variable | | |
| R19 = −44.931 | D19 = 0.70 | N10 = 1.487490 | v10 = 70.2 |
| R20 = 10.882 | D20 = variable | | |
| R21 = 14.255 | D21 = 2.90 | N11 = 1.804000 | v11 = 46.6 |
| R22 = −13.213 | D22 = 0.60 | N12 = 1.846660 | v12 = 23.9 |
| R23 = −52.741 | D23 = variable | | |
| R24 = ∞ | D24 = 1.00 | N13 = 1.516330 | v13 = 64.1 |
| R25 = ∞ | | | |

| Variable | Focal Length | | |
|---|---|---|---|
| Distance | 6.69 | 34.34 | 64.60 |
| D5 | 0.70 | 14.46 | 19.30 |
| D11 | 21.60 | 5.33 | 3.00 |
| D18 | 1.50 | 4.00 | 1.50 |
| D20 | 7.06 | 2.53 | 9.15 |
| D23 | 5.94 | 10.47 | 3.86 |

Aspherical Coefficient

R14 k=−1.57038e+02 B=−2.17502e-04 C=2.02940e-05 D=−6.31367e-07 E=0.00000e+00

R20 k=−2.33682e-01 B=−3.34645e-05 C=−2.74965e-06 D=1.56954e-07 E=0.00000e+00

R20 Effective Surface Diameter 07.0

Second Numerical Example
f = 6.57-64.60   Fno = 3.60-5.67   2ω = 54.0°-5.9°

| | | | |
|---|---|---|---|
| R1 = 33.377 | D1 = 1.30 | N1 = 1.805181 | v1 = 25.4 |
| R2 = 21.174 | D2 = 4.00 | N2 = 1.496999 | v2 = 81.5 |
| R3 = −240.100 | D3 = 0.10 | | |
| R4 = 19.793 | D4 = 2.40 | N3 = 1.603112 | v3 = 60.6 |
| R5 = 53.667 | D5 = variable | | |
| R6 = 44.810 | D6 = 0.70 | N4 = 1.882997 | v4 = 40.8 |
| R7 = 5.910 | D7 = 2.91 | | |
| R8 = −31.654 | D8 = 0.60 | N5 = 1.696797 | v5 = 55.5 |
| R9 = 18.575 | D9 = 0.40 | | |
| R10 = 10.881 | D10 = 1.70 | N6 = 1.922860 | v6 = 18.9 |
| R11 = 28.343 | D11 = variable | | |
| R12 = aperture stop | D12 = 1.50 | | |
| R13 = 10.638 | D13 = 2.00 | N7 = 1.693500 | v7 = 53.2 |
| R14 = −38.183 | D14 = 3.46 | | |
| R15 = 57.052 | D15 = 0.60 | N8 = 1.846660 | v8 = 23.9 |
| R16 = 8.362 | D16 = 0.17 | | |
| R17 = 11.582 | D17 = 2.10 | N9 = 1.603112 | v9 = 60.6 |
| R18 = −22.242 | D18 = variable | | |
| R19 = −38.536 | D19 = 0.50 | N10 = 1.516330 | v10 = 64.1 |
| R20 = 14.169 | D20 = variable | | |
| R21 = 14.777 | D21 = 2.90 | N11 = 1.804000 | v11 = 46.6 |
| R22 = −17.837 | D22 = 0.60 | N12 = 1.846660 | v12 = 23.9 |
| R23 = −69.384 | D23 = variable | | |
| R24 = ∞ | D24 = 1.00 | N13 = 1.516330 | v13 = 64.1 |
| R25 = ∞ | | | |

| Variable | Focal Length | | |
|---|---|---|---|
| Distance | 6.57 | 32.31 | 64.60 |
| D5 | 0.70 | 14.46 | 19.30 |
| D11 | 20.08 | 3.81 | 1.48 |
| D18 | 1.50 | 4.00 | 1.50 |
| D20 | 6.07 | 2.63 | 9.28 |
| D23 | 6.42 | 9.87 | 3.21 |

Aspherical Coefficient

R14 k=−1.53867e+02 B=−1.73137e−04 C=1.46800e−05 D=−3.82811e−07 E=0.00000e+00

R20 k=−2.00596e−01 B=7.52282e−07 C=−6.45104e−07 D=1.81296e−08 E=0.00000e+00

R20 Effective Surface Diameter φ7.8

Third Numerical Example
f = 6.57-64.60   Fno = 3.61-5.67   2ω = 54.1°-5.9°

| | | | |
|---|---|---|---|
| R1 = 33.754 | D1 = 1.30 | N1 = 1.805181 | ν1 = 25.4 |
| R2 = 21.303 | D2 = 4.00 | N2 = 1.496999 | ν2 = 81.5 |
| R3 = −213.917 | D3 = 0.10 | | |
| R4 = 19.936 | D4 = 2.40 | N3 = 1.603112 | ν3 = 60.6 |
| R5 = 53.974 | D5 = variable | | |
| R6 = 43.683 | D6 = 0.70 | N4 = 1.882997 | ν4 = 40.8 |
| R7 = 5.931 | D7 = 2.91 | | |
| R8 = −30.281 | D8 = 0.60 | N5 = 1.696797 | ν5 = 55.5 |
| R9 = 19.484 | D9 = 0.40 | | |
| R10 = 10.996 | D10 = 1.70 | N6 = 1.922860 | ν6 = 18.9 |
| R11 = 28.689 | D11 = variable | | |
| R12 = aperture stop | D12 = 1.50 | | |
| R13 = 10.406 | D13 = 2.00 | N7 = 1.693500 | ν7 = 53.2 |
| R14 = −34.905 | D14 = 3.21 | | |
| R15 = 63.429 | D15 = 0.60 | N8 = 1.846660 | ν8 = 23.9 |
| R16 = 8.202 | D16 = 0.18 | | |
| R17 = 11.588 | D17 = 2.10 | N9 = 1.603112 | ν9 = 60.6 |
| R18 = −16.225 | D18 = variable | | |
| R19 = −26.281 | D19 = 1.00 | N10 = 1.496999 | ν10 = 81.5 |
| R20 = 10.539 | D20 = variable | | |
| R21 = 13.631 | D21 = 2.90 | N11 = 1.804000 | ν11 = 46.6 |
| R22 = −19.551 | D22 = 0.60 | N12 = 1.922860 | ν12 = 18.9 |
| R23 = −51.178 | D23 = variable | | |
| R24 = ∞ | D24 = 1.00 | N13 = 1.516330 | ν13 = 64.1 |
| R25 = ∞ | | | |

| Variable | Focal Length | | |
|---|---|---|---|
| Distance | 6.57 | 31.79 | 64.60 |
| D5 | 0.70 | 14.46 | 19.30 |
| D11 | 20.08 | 3.81 | 1.48 |
| D18 | 1.50 | 4.00 | 1.50 |
| D20 | 6.31 | 3.94 | 9.45 |
| D23 | 5.88 | 8.26 | 2.74 |

Aspherical Coefficient

R14 k=−1.28214e+02 B=−1.60916e−04 C=1.45672e−05 D=−3.28183e−07 E=0.00000e+00

R20 k=−1.29868e+00 B=4.10305e−05 C=1.05034e−06 D=−3.84822e−08 E=0.00000e+00

R20 Effective Surface Diameter φ7.6

Fourth Numerical Example
f = 6.60-64.60   Fno = 3.61-5.67   2ω = 53.8°-5.9°

| | | | |
|---|---|---|---|
| R1 = 32.924 | D1 = 1.30 | N1 = 1.805181 | ν1 = 25.4 |
| R2 = 21.055 | D2 = 4.00 | N2 = 1.496999 | ν2 = 81.5 |
| R3 = −248.176 | D3 = 0.10 | | |
| R4 = 20.377 | D4 = 2.40 | N3 = 1.603112 | ν3 = 60.6 |
| R5 = 56.510 | D5 = variable | | |
| R6 = 43.312 | D6 = 0.70 | N4 = 1.882997 | ν4 = 40.8 |
| R7 = 5.928 | D7 = 2.91 | | |
| R8 = −30.329 | D8 = 0.60 | N5 = 1.696797 | ν5 = 55.5 |
| R9 = 19.619 | D9 = 0.40 | | |
| R10 = 10.895 | D10 = 1.70 | N6 = 1.922860 | ν6 = 18.9 |
| R11 = 27.754 | D11 = variable | | |
| R12 = aperture stop | D12 = 1.50 | | |
| R13 = 10.298 | D13 = 2.00 | N7 = 1.693500 | ν7 = 53.2 |
| R14 = −33.400 | D14 = 2.99 | | |
| R15 = 61.357 | D15 = 0.60 | N8 = 1.846660 | ν8 = 23.9 |
| R16 = 8.105 | D16 = 0.18 | | |
| R17 = 11.585 | D17 = 2.10 | N9 = 1.603112 | ν9 = 60.6 |
| R18 = −13.897 | D18 = variable | | |
| R19 = −22.957 | D19 = 1.00 | N10 = 1.496999 | ν10 = 81.5 |
| R20 = 8.619 | D20 = 0.10 | N11 = 1.514210 | ν11 = 51.4 |
| R21 = 9.116 | D21 = variable | | |
| R22 = 13.128 | D22 = 2.90 | N12 = 1.804000 | ν12 = 46.6 |
| R23 = −18.780 | D23 = 0.60 | N13 = 1.922860 | ν13 = 18.9 |
| R24 = −51.178 | D24 = variable | | |
| R25 = ∞ | D25 = 1.00 | N14 = 1.516330 | ν14 = 64.1 |
| R26 = ∞ | | | |

| Variable | Focal Length | | |
|---|---|---|---|
| Distance | 6.60 | 31.90 | 64.60 |
| D5 | 0.70 | 14.46 | 19.30 |
| D11 | 20.08 | 3.81 | 1.48 |
| D18 | 1.50 | 4.00 | 1.50 |
| D20 | 6.73 | 4.97 | 9.69 |
| D24 | 5.62 | 7.38 | 2.66 |

Aspherical Coefficient

R14 k=−1.54303 e+02 B=−2.55352e−04 C=2.38816e−05 D=−6.81134e−07 E=0.00000e+00

R21 k=−1.64957e+00 B=8.28444e−05 C=3.31601e−06 D=−1.15059e−07 E=0.00000e+00

R21 Effective Surface Diameter φ6.4

In the fourth numerical example, the lens component defined by the lens surfaces R19, R20, and R21 is a replica aspherical lens in which a thin resin layer is provided on the lens surface R20 of a spherical glass lens defined by the lens surfaces R19 and R20.

Table 1 shows the relationships between the above-described conditional expressions and the values in the numerical examples:

TABLE 1

| | Numerical Example | | | |
|---|---|---|---|---|
| | 1 | 2 | 3 | 4 |
| Conditional Expression 1 | 70.2 | 64.1 | 81.5 | 81.5 |
| Conditional Expression 2 | 0.10 | 0.08 | 0.15 | 0.17 |
| Conditional Expression 3 | 0.61 | 0.46 | 0.43 | 0.43 |
| Conditional Expression 4 | 2.66 | 3.04 | 2.28 | 1.97 |

TABLE 1-continued

| | Numerical Example | | | |
|---|---|---|---|---|
| | 1 | 2 | 3 | 4 |
| Conditional Expression 5 | −0.69 | −0.62 | −0.80 | −0.92 |
| Conditional Expression 6 | $5.81 \times 10^{-4}$ | $1.66 \times 10^{-4}$ | $1.36 \times 10^{-3}$ | $1.41 \times 10^{-3}$ |
| Conditional Expression 7 | 4.84 | 4.98 | 4.95 | 4.94 |
| Conditional Expression 8 | 1.07 | 1.12 | 1.13 | 1.13 |
| Conditional Expression 9 | 1.85 | 2.03 | 1.87 | 1.77 |
| Conditional Expression 10 | 2.21 | 2.41 | 2.19 | 2.12 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A zoom lens comprising:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein the first to fifth lens units are arranged in order from an object side toward an image side,
wherein zooming is performed by moving some of the five lens units so that a distance between the first lens unit and the second lens unit is longer, a distance between the second lens unit and the third lens unit is shorter, and a distance between the fourth lens unit and the fifth lens unit is longer at a telephoto end than at a wide angle end,
wherein the fourth lens unit is formed by one lens component, and is moved for image shifting in a direction having a component that is perpendicular to an optical axis of the zoom lens,
wherein the lens component includes a negative lens, and the following conditional expressions are satisfied:

$70.2 \leq v4$, $D4/fw < 0.3$, $1.0 < |f4|/fw < 4.0$, $3.0 < f1/fw < 6.0$, and $1.07 \leq |f2|/fw < 1.4$, where v4 represents the Abbe number of the material of the negative lens, D4 represents the thickness of the fourth lens unit on the optical axis, fw represents the focal length of the entire zoom lens at the wide angle end, f4 represents the focal length of the fourth lens unit, f1 represents the focal length of the first lens unit, and f2 represents the focal length of the second lens unit, and wherein the following conditional expression is satisfied:

$0.43 \leq (R4a+R4b)/(R4a-R4b) < 1.0$, where R4a represents the radius of curvature of a lens surface of the fourth lens unit closest to the object side, and R4b represents the radius of curvature of a lens surface of the fourth lens unit closest to the image side.

2. The zoom lens according to claim 1, wherein the fourth lens unit is formed by a biconcave negative lens.

3. The zoom lens according to claim 1, wherein the fourth lens unit includes a biconcave negative lens and a resin layer provided on at least one surface of the negative lens, and a surface of the resin layer in contact with air is aspherical.

4. The zoom lens according to claim 1, wherein the zoom lens forms an image on a solid-state image pickup element.

5. An image pickup apparatus comprising:
the zoom lens according to claim 1; and
a solid-state image pickup element configured to receive an image formed by the zoom lens.

* * * * *